March 14, 1939.   H. KUPPENBENDER   2,150,626
FILTER ATTACHING MEANS FOR PHOTOGRAPHIC CAMERAS
Filed Jan. 24, 1938   2 Sheets-Sheet 1
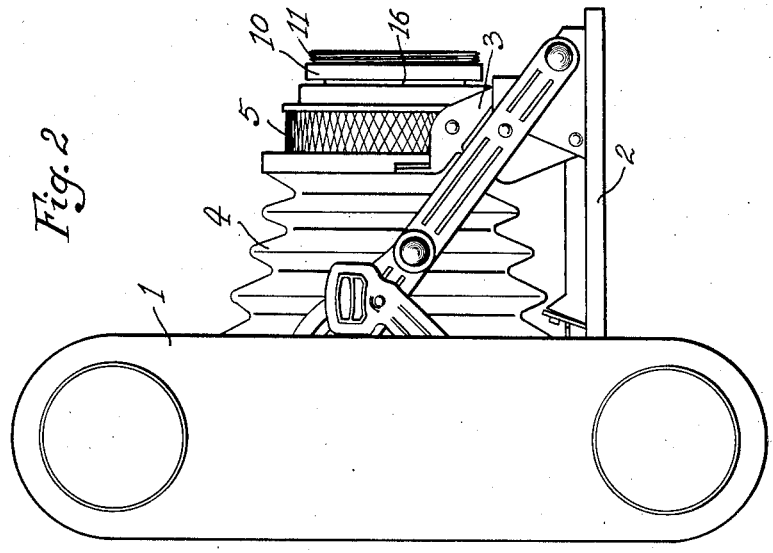
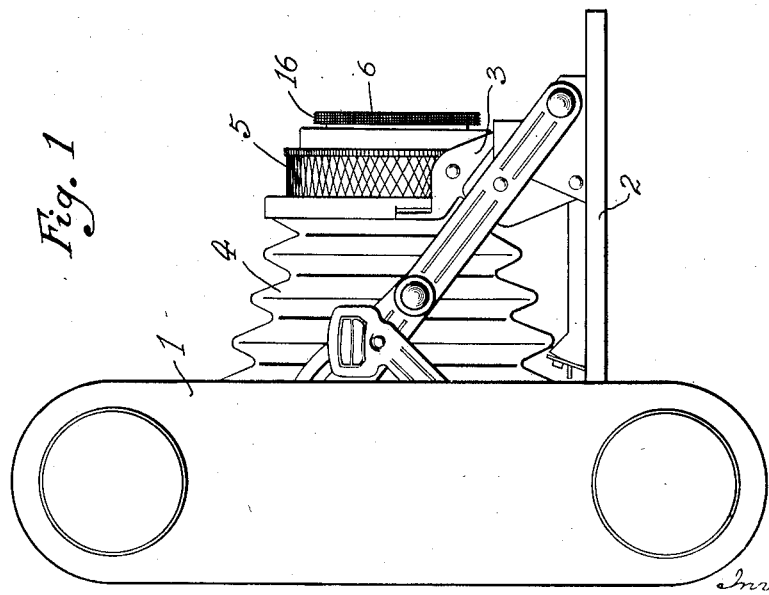
Inventor
Heinz Kuppenbender
by B. Singer
Attorney March 14, 1939.                H. KUPPENBENDER                2,150,626
                FILTER ATTACHING MEANS FOR PHOTOGRAPHIC CAMERAS
                     Filed Jan. 24, 1938        2 Sheets-Sheet 2
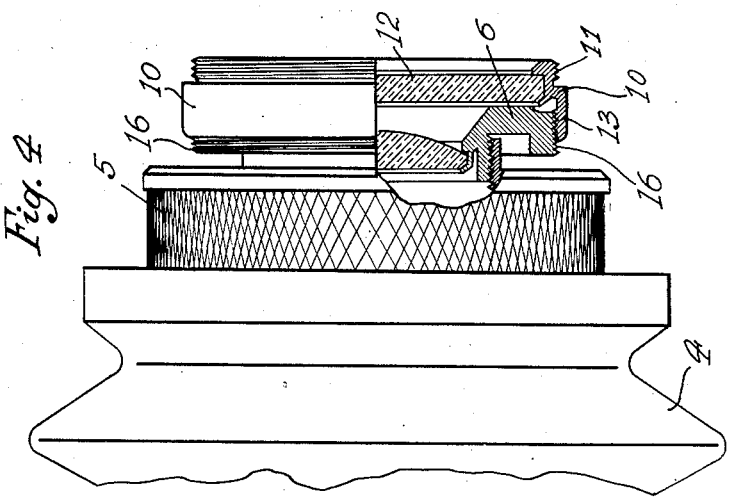
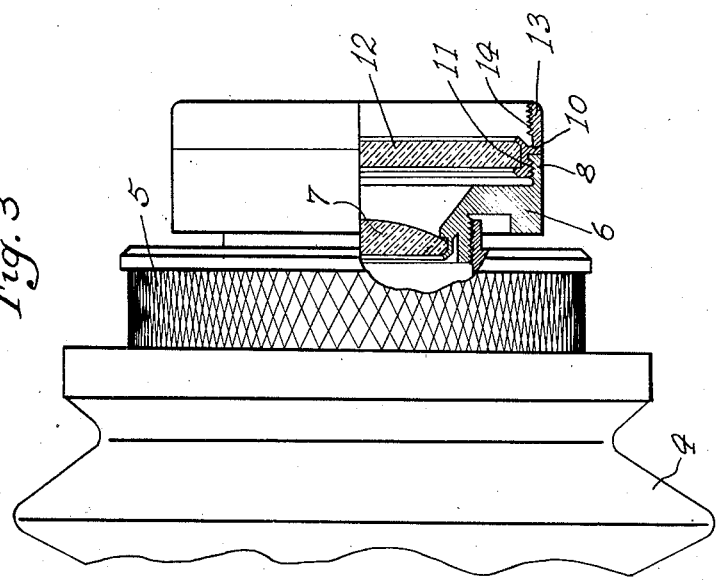
Inventor
Heinz Küppenbender
by B. Singer
Attorney Patented Mar. 14, 1939

2,150,626

UNITED STATES PATENT OFFICE 2,150,626

FILTER ATTACHING MEANS FOR PHOTOGRAPHIC CAMERAS

Heinz Kuppenbender, Dresden, Germany, assignor to Zeiss Ikon Aktiengesellschaft, Dresden, Germany Application January 24, 1938, Serial No. 186,572
In Germany February 24, 1937

5 Claims. (Cl. 95—81.5)

The invention relates to improvements in filter attaching means for photographic cameras and particularly is directed to filter mountings which are attached by means of a threaded connection to the mounting of the camera objective.

Heretofore it had been customary to provide the mounting of the front lens of the camera objective with an annular extension having an interior thread for receiving an exteriorly threaded annular extension on one end of the mounting of the filter, which filter may be a color filter of any desired characteristic, as for instance a yellow filter. The filter mounting preferably is provided at its other end with another annular extension having an interior thread for the attachment of a lens shade. This well known arrangement of the filter, however, has the disadvantage, that when the filter is applied to a bellows camera, the filter has to be removed from the camera objective whenever the camera is to be folded together and the hinged base board to which the objective carrier is connected is to be closed. This is due to the fact, that the filter mounting extends so far in front of the camera objective that it would prevent a closing of the camera if left on the objective mounting.

It is now an object of the invention to arrange and construct the filter mounting in such a manner that it may remain on the objective mounting when the camera is closed. This is accomplished by eliminating the interiorly threaded annular extension on the camera objective mounting as it has been provided heretofore and employing in place thereof a thread on the outer circumference of said objective mounting for engaging an interior thread on the filter mounting. In this way the axial projection of the filter mounting from the camera objective mounting is considerably reduced, namely to such an extent, that the filter mounting when left on the objective mounting does no longer interfere with the closing of the camera or the camera base board respectively.

Another object of the invention is to employ the interior thread of the filter mounting, heretofore used for attaching a lens shade, for attaching the filter mounting to the exterior thread on the camera objective mounting. Such an arrangement does not only permit the use of the filter mounting as heretofore attached to an interior thread in an annular extension of the objective mounting, but also shortens the distance the filter mounting projects from the camera objective mounting and permits a closing of the camera without removing the filter.

Other objects of the invention will be apparent from the following description forming a part of this specification.

Referring to the drawings:

Fig. 1 is a side elevation view of a bellows camera in extended or operative position and provided with an objective mounting having in accordance with the present invention an exterior thread for mounting thereon a filter mounting.

Fig. 2 is the same camera as shown in Fig. 1, but having a filter attached thereto.

Fig. 3 illustrates in an enlarged scale and partly in section the front portion of a camera to which a filter is attached in a manner heretofore practiced, and Fig. 4 illustrates in an enlarged scale and partly in section the front portion of the camera shown in Fig. 2 to show in detail the filter attachment in accordance with the present invention.

The Figs. 1 and 2 illustrate by way of example a rollfilm camera provided with a casing 1 having a hinged base board 2 operatively connected with the camera objective carrier 3 which in turn is connected with the bellows 4.

The camera objective mounting indicated as a whole at 5 includes a detachable annular mounting member 6 in which the front lens 7 of the camera objective is secured. As illustrated in Fig. 3 it was heretofore customary to provide the annular member 6 on its outer end with an axially projecting flange 8 whose inner circumference was threaded to permit the attachment of a filter mounting 10 provided at one end thereof with an exterior thread indicated at 11. The filter mounting 10 may be provided with any desired filter 12, as for instance a yellow filter, and preferably, as shown, is provided on its other end with an axial flange 13 having an inner thread 14 for the attachment of a lens shade (not shown). It will be noted that this well known arrangement of the filter has the disadvantage that the outer end of the filter mounting 10 extends so far in front of the camera objective, that the base board 2 upon folding the camera would hit against the filter mounting, if the latter were left on the objective, and would prevent a closing of the camera.

In accordance with the present invention the axial flange 8 on the mounting member 6 of the front lens of the camera objective is omitted and the outer circumference of this lens mounting 6, in addition to its customary knurling, is provided with a thread 16 for the attachment of a filter mounting. In this way, the axial projection of the filter mounting in front of the camera objective is reduced considerably, at least to such an extent that the camera can be closed even though the filter is left on the objective.

In the embodiment of the invention illustrated in Fig. 4 the same filter mounting is employed which heretofore was used in connection with the known camera objective provided with the special mounting flange 8. The only difference is that the filter mounting 10 is attached in reverse position. The interiorly threaded flange 13, heretofore used for attaching a lens shade thereon, is secured onto the exterior thread 16 of the lens mounting member 6, while the other end of the filter mounting 10 provided with the exterior thread 11 is now used for the attachment of a lens shade.

A comparison of the Figs. 3 and 4 will show that in Fig. 4 the filter mounting 10 extends a smaller distance in front of the camera objective than in Fig. 3. The difference is sufficient to permit a closing of the camera whose filter arrangement is constructed as shown in Fig. 4 without removing the filter from the camera objective.

What I claim is:

1. In a folding photographic camera, the combination with a camera objective, a mounting therefor, and a hinged base board forming a closure of said camera when folded and a support for said camera objective when in operative position, of a filter detachably mounted in front of said camera objective, said filter including a mounting and a filter disc mounted therein, said filter mounting being provided with an interior thread for engaging an exterior thread on the outer end of said objective mounting, said filter disc in the attached position of the filter engaging the outer end face of said objective mounting and the filter mounting extending such a small distance in front of the objective mounting that upon folding the camera the hinged base may be closed without removing said filter.

2. In a folding photographic camera, the combination with a camera objective, a mounting therefor, and a hinged base board forming a closure of said camera when folded and a support for said camera objective when in operative position, of a filter detachably mounted in front of said camera objective, said filter including a mounting and a filter disc mounted therein, said filter mounting being provided with an interior thread engaging an exterior thread arranged in a knurled circumferential surface portion of said objective mounting, said filter disc in the attached position of the filter engaging the outer end face of said objective mounting and the filter mounting extending such a small distance in front of the objective mounting that upon folding the camera the hinged base may be closed without removing said filter.

3. In a folding photographic camera, the combination with a camera objective, a mounting therefor, and a hinged base board forming a closure of said camera when folded and a support for said camera objective when in operative position, of a filter detachably mounted in front of said camera objective, said filter including an annular mounting and a filter disc mounted therein, said annular mounting being provided at one end with an interior thread and at the other end with an axial flange threaded on its outer circumference for the attachment of a lens shade, said interior thread engaging an exterior thread on the outer end of said objective mounting, said filter disc in the attached position of the filter engaging the outer end face of said objective mounting and the filter mounting extending such a small distance in front of said objective mounting that upon folding the camera the hinged base may be closed without removing said filter.

4. In a photographic camera, the combination with a camera objective, and a mounting therefor, of a filter detachably mounted in front of said camera objective, said filter including an annular mounting and a filter disc mounted therein, said annular mounting being provided at one end with an interior thread and at the other end with an axial flange threaded on its outer circumference for the attachment of a lens shade, said interior thread being provided for engaging an exterior thread on the outer end of said objective mounting, said filter disc engaging the end face of said outer end of said objective mounting when the filter mounting is attached thereto.

5. In a photographic camera, the combination with a camera objective, and a mounting therefor, of a filter detachably mounted in front of said camera objective, said filter including an annular mounting and a filter disc mounted therein, said annular mounting being provided at one end with an interior thread and at the other end with an axial flange provided with an exterior thread for the attachment of a lens shade, said threads having the same diameter, said interior thread being provided for engaging an exterior thread on the outer end of said objective mounting, said filter disc engaging the end face of said outer end of said objective mounting when the filter mounting is attached thereto.

HEINZ KUPPENBENDER.